(12) United States Patent
Ji et al.

(10) Patent No.: US 11,223,274 B2
(45) Date of Patent: Jan. 11, 2022

(54) SYSTEM AND METHOD OF CONTROLLING DEAD TIME OF CONVERTER

(71) Applicant: SOLUM CO., LTD., Yongin-si (KR)

(72) Inventors: Sang Keun Ji, Yongin-si (KR); Dong Kyun Ryu, Seoul (KR)

(73) Assignee: SOLUM CO., LTD., Yongin-si (KR)

( * ) Notice: Subject to any disclaimer, the term of this patent is extended or adjusted under 35 U.S.C. 154(b) by 31 days.

(21) Appl. No.: 16/785,299

(22) Filed: Feb. 7, 2020

(65) Prior Publication Data
US 2021/0143731 A1 May 13, 2021

(30) Foreign Application Priority Data

Nov. 11, 2019 (KR) .................. 10-2019-0143331

(51) Int. Cl.
*H02M 1/38* (2007.01)
*H02M 3/335* (2006.01)
*H02M 3/00* (2006.01)
*H02M 1/00* (2006.01)
*H02M 1/08* (2006.01)

(52) U.S. Cl.
CPC ............ *H02M 1/38* (2013.01); *H02M 1/083* (2013.01); *H02M 3/01* (2021.05); *H02M 3/33569* (2013.01); *H02M 1/0058* (2021.05)

(58) Field of Classification Search
CPC .......... H02M 1/38; H02M 1/385; H02M 1/32; H02M 2001/0058; H02M 1/0058; H02M 3/156; H02M 3/158; H02M 3/335; H02M 3/33507; H02M 3/33569; H02M 3/01; H02M 3/015; H02M 1/08; H02M 1/088
See application file for complete search history.

(56) References Cited

U.S. PATENT DOCUMENTS

| 2005/0281058 A1 | 12/2005 | Batarseh et al. | |
| 2006/0152204 A1* | 7/2006 | Maksimovic | H02M 3/1588 323/284 |
| 2008/0278125 A1* | 11/2008 | Pigott | H02M 3/1588 323/271 |

(Continued)

FOREIGN PATENT DOCUMENTS

JP 2017526329 A 9/2017

OTHER PUBLICATIONS

Jung, J. et al., "Theoretical Analysis and Optimal Design of LLC Resonant Converter," Proceedings of the 2007 European Conference on Power Electronics and Applications, Sep. 2, 2007, Aalborg, Denmark, 10 pages.

(Continued)

*Primary Examiner* — Gustavo A Rosario-Benitez
(74) *Attorney, Agent, or Firm* — McCoy Russell LLP

(57) ABSTRACT

Provided is a system of varying a dead time of a converter, including a converter including a plurality of semiconductor switches to which a dead time is applied during an alternate switching operation; and a controller controlling ON/OFF of the plurality of semiconductor switches and setting the dead time, wherein the controller varies the dead time during an operation of the converter. According to the present invention, an over dead-time may be detected and varied to an appropriate dead time, thereby minimizing power loss of the converter and increasing efficiency thereof.

12 Claims, 6 Drawing Sheets

(56) References Cited

U.S. PATENT DOCUMENTS

| | | | |
|---|---|---|---|
| 2009/0146630 A1* | 6/2009 | Naka | H02M 1/38 |
| | | | 323/283 |
| 2012/0105039 A1* | 5/2012 | Brown | H02M 1/08 |
| | | | 323/283 |
| 2012/0262953 A1* | 10/2012 | Jungreis | H02M 3/33569 |
| | | | 363/17 |
| 2014/0167722 A1* | 6/2014 | Lee | H02M 3/1588 |
| | | | 323/282 |
| 2017/0244316 A1* | 8/2017 | Phadke | H02M 3/335 |
| 2018/0026538 A1* | 1/2018 | Dalena | H02M 3/158 |
| | | | 323/271 |
| 2018/0123442 A1* | 5/2018 | Vangala | H02M 1/083 |
| 2018/0131282 A1* | 5/2018 | Chen | H02M 1/08 |
| 2018/0234016 A1* | 8/2018 | Acar | H02M 3/158 |
| 2018/0323696 A1* | 11/2018 | Gammie | H03K 17/567 |
| 2018/0351539 A1* | 12/2018 | Petrina | H02M 1/08 |

OTHER PUBLICATIONS

Korean Intellectual Property Office, Office Action Issued in Application No. 10-2019-0143331, dated Sep. 17, 2020, 10 pages.

* cited by examiner

SYSTEM AND METHOD OF CONTROLLING DEAD TIME OF CONVERTER

CROSS-REFERENCE TO RELATED APPLICATIONS

This application claims priority under 35 U.S.C. § 119 to Korean Patent Application No. 10-2019-0143331, filed on Nov. 11, 2019, in the Korean Intellectual Property Office, the disclosure of which is incorporated herein by reference in its entirety.

TECHNICAL FIELD

The following disclosure relates to a system and method of controlling (i.e., varying) a dead time of a converter, capable of detecting an over dead-time of the converter and varying a dead time upon detection of the over dead-time.

BACKGROUND

Recently, high density power circuits to make power devices compact and slim have been actively researched and high frequency driving may be essential to minimize a size and obtain high efficiency of reactive devices such as inductors, transformers, and capacitors that occupy a large space in power conversion converter circuits. Therefore, gallium nitride (GaN) and silicon carbide (SiC), which are wide band gap (WBG) devices for high frequency driving, have emerged, and research and development of high density and high efficiency circuits have actively been conducted.

In general, converters having a 100 kHz switching frequency are mainly used, and in the case of frequency controlling, a frequency control range from no load to a maximum load is about 20%. Therefore, in the case of driving at a frequency of 1 MHz for the purpose of high density, a frequency of 200 kHz is varied depending on a load when the frequency variable range is 20%.

Meanwhile, in the case of a half-bridge type converter, two semiconductor switches are connected in a bridge-arm structure and alternately operate with each other, and here, in order to prevent a short circuit due to simultaneous conduction between the two semiconductor switches, i.e., an arm short phenomenon, a dead time during which both semiconductor switches are turned off is applied.

Under light load conditions, in the case of driving at 1 MHz, a large dead time may be inevitably used to prevent gate malfunction due to high frequency noise, but as the load increases and the frequency decreases, a time required for satisfying zero voltage switching (ZVS) is shortened, leaving a large set dead time, which reduces efficiency of the converter.

That is, in order to minimize power loss and increase the efficiency of the converter, not only an appropriate dead time must be set but also the dead time needs to be varied according to situations during an operation. However, in a general dead time generating circuit of the related art, a resistor is connected to a ground at an IC DT pin and a dead time is determined based on a current amount flowing through the DT pin, and once the dead time is set, the set dead time is constantly held even under a condition in which an operating frequency is varied.

SUMMARY

An exemplary embodiment of the present invention is directed to providing a system and method of varying a dead time of a converter, capable of detecting an over dead-time that occurs during an operation of a converter.

Another exemplary embodiment of the present invention is directed to providing a system and method of varying a dead time of a converter, capable of appropriately varying a dead time upon detection of an over dead-time.

Another exemplary embodiment of the present invention is directed to providing a system and method of varying a dead time of a converter, capable of increasing efficiency by minimizing power loss of a resonant converter.

In one general aspect, a system of varying a dead time of a converter includes: a converter including a plurality of semiconductor switches to which a dead time is applied during an alternate switching operation; and a controller controlling ON/OFF of the plurality of semiconductor switches and setting the dead time, wherein the controller varies the dead time during an operation of the converter.

The controller may vary the dead time when detecting an over dead-time during the operation of the converter.

The controller may include: an initial dead time calculator determining an initial value of the dead time; an over dead-time detector detecting occurrence of the over dead-time during operation of the converter; and a dead time resetter varying the dead time and applying the varied dead time to the converter when the occurrence of the over dead-time is detected.

The converter may further include: a resonant tank, which includes a resonant inductor and a resonant capacitor, and a transformer, and the initial dead time calculator may calculate the initial value of the dead time using an equation below.

$$T_{dead\_init} = 16n^2 \times C_j \times f_{sw} \times L_m \quad \text{[Equation]}$$

Here, n is a turn ratio of the transformer, Cj is internal capacitance of one of a plurality of semiconductor switches performing an alternate switching operation, fsw is a switching frequency of the one semiconductor switch, and Lm is magnetizing inductance of the transformer.

The initial dead time calculator may determine the initial value of the dead time based on an initial set value of a first parameter input from an upper controller or a user.

The first parameter may be an input voltage and an output voltage, the initial value of the dead time may decrease as the input voltage increases, and the initial value of the dead time may increase as the output voltage increases.

The first parameter may be an output power, and the initial value of the dead time may increase as the output power increases.

The over dead-time detector may include: a voltage detector monitoring in real time a drain-source voltage of one of the plurality of semiconductor switches that perform an alternate switching operation; and a peak detector detecting a peak value of the voltage, wherein it may be determined that the over dead-time occurs when the voltage is reduced by a first reference value from the peak value within a half period of a waveform of the voltage.

Here, the peak detector may be reset every one cycle of switching of the one semiconductor switch.

The over dead-time detector may further include a detector detecting a point at which the voltage is lower than or equal to a second reference value, and the peak detector may be reset when the detector detects the point at which the voltage is lower than or equal to the second reference value.

The over dead-time detector may include: a dead time storage pre-storing a value of a second parameter of the converter that determines the dead time and a value of the dead time corresponding to the value of the second parameter; a sensor monitoring the value of the second parameter in real time; and a comparator comparing a currently input value of a dead time with the pre-stored value of the dead time corresponding to the value of the second parameter, wherein it is determined that the over dead-time occurs when the current value of the dead time exceeds the pre-stored value of the dead time.

The second parameter may be: an input voltage; an output voltage and an output power; an input voltage, an output voltage, and an input power; or a switching frequency.

When the over dead-time is detected, the dead time resetter may vary the current dead-time by a third reference value to reset the dead-time and apply the reset dead time to the converter.

The controller may further include an arm short detector detecting an arm short phenomenon of the converter, and when the arm short phenomenon is detected after the dead time is reset, the dead time resetter may vary the reset dead time with a fourth reference value.

In another general aspect, a method of varying a dead time of a converter including a plurality of semiconductor switches to which a dead time is applied at the time of an alternate switching operation, includes: calculating an initial value of the dead time and starting switching by the converter; determining whether an over dead-time or an arm short occurs during an operation of the converter; and decreasing a current dead time when it is determined that the over dead-time occurs, and increasing the current dead time when it is determined that the arm short occurs.

Other features and aspects will be apparent from the following detailed description, the drawings, and the claims.

DETAILED DESCRIPTION OF EXEMPLARY EMBODIMENTS

Hereinafter, a system and method of varying a dead time of a converter according to the present invention will be described in detail with reference to the accompanying drawings. The accompanying drawings are provided by way of example in order to sufficiently convey the technical spirit of the present invention to those skilled in the art and the present invention is not limited to the drawings presented below and can be embodied in any other form.

Figure 1:
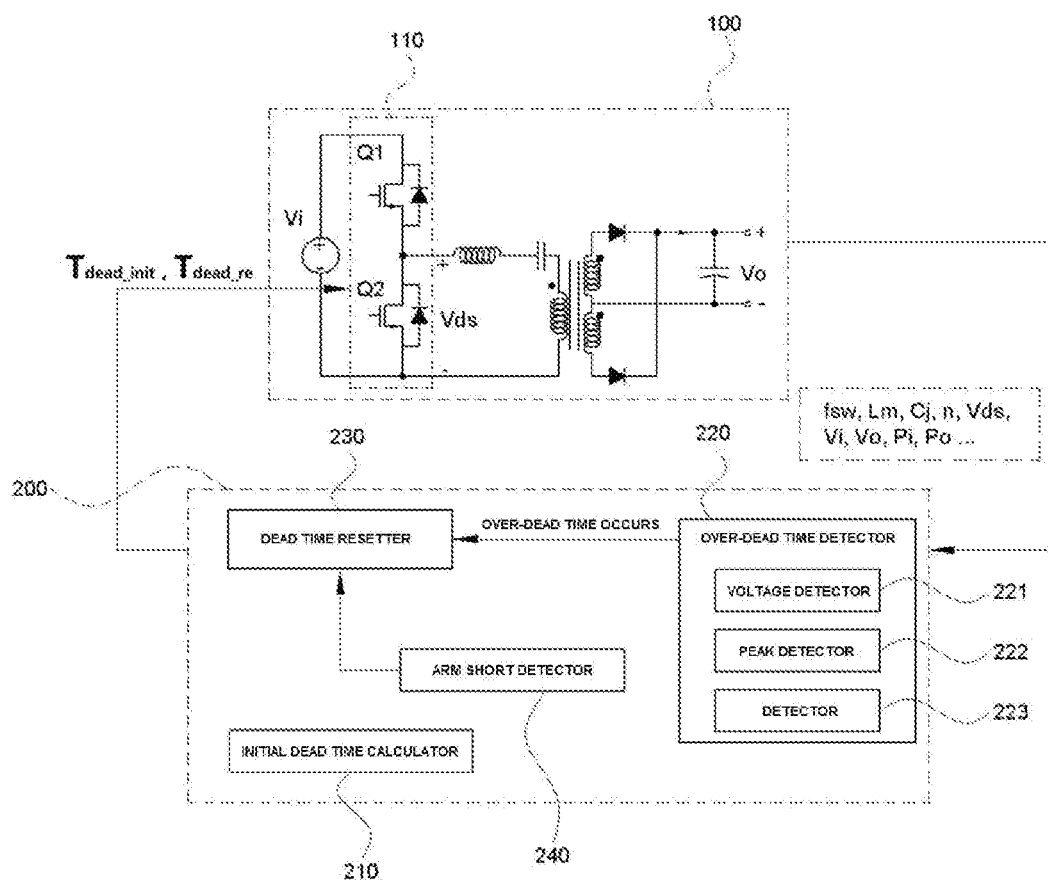
FIG. 1 is a view illustrating a system of varying a dead time of a converter according to an exemplary embodiment of the present invention.

FIG. 1 is a view illustrating a system of varying a dead time of a converter according to an exemplary embodiment of the present invention.

The system of varying a dead time of a converter according to an exemplary embodiment of the present invention may include a converter 100 and a controller 200.

The converter 100 may have a form such as a half-bridge type, a full-bridge type, or the like and may include a direct current (DC) voltage source, a plurality of semiconductor switches, a resonant tank, a transformer, a rectifier diode, and a load.

In an exemplary embodiment of the present invention, the half-bridge type converter 100 is illustrated but other types of converters may be used in the system of varying a dead time of a converter according to the present invention.

As for the plurality of semiconductor switches, two semiconductor switches Q1 and Q2 may be connected in series to form a bridge-arm 110. Here, in the case of the half-bridge type, the upper semiconductor switch Q1 and the lower semiconductor switch Q2 forming the bridge arm 110 alternately perform a switching operation, and in order to prevent an arm short of the bridge-arm 110, a dead time for which both the upper semiconductor switch Q1 and the lower semiconductor switch Q2 are turned off is applied during an operation of the converter 100.

The resonant tank includes a resonant inductor and a resonant capacitor, and in the case of an inductor-inductor-capacitor (LLC) resonant converter, a resonant tank further includes a magnetizing inductor of a transformer.

The controller 200 may include an initial dead time calculator 210, an over dead-time detector 220, and a dead time resetter 230.

The initial dead time calculator 210 may calculate an initial value Tdead_init of the dead time using Equation 1 below based on a turn ratio n of the transformer, internal capacitance Cj of the lower semiconductor switch Q2, a switching frequency fsw of the lower semiconductor switch Q2, and magnetizing inductance Lm of the transformer.

$$T_{dead\_init} = 16n^2 \times C_j \times f_{sw} \times L_m \quad \text{[Equation 1]}$$

A process of calculating the initial value Tdead_init of the dead time using Equation 1 is as follows.

In order to satisfy zero voltage switching (ZVS) in the resonant converter, energy of the magnetizing inductance, i.e., a maximum value of a current $I_{Lm}$ flowing in the magnetizing inductance, must be able to discharge parasitic capacitance of the two semiconductor switches Q1 and Q2.

Here, a peak value of the current $I_{Lm}$ flowing in the magnetizing inductance is as shown in Equation 2 below. Here, $T_{SW}$ denotes a switching period of the semiconductor switch, Vo denotes an output voltage, and Vi denotes an input voltage.

$$\frac{V_o}{T_m}\frac{1}{2}\frac{T_{sw}}{2} = \frac{Vo}{4L_m}T_{sw} = \frac{V_i}{8n^2 L_m}T_{sw} \quad \text{[Equation 2]}$$

The amount of charge charged in and discharged from parasitic capacitance is as shown in Equation 3 below.

$$Q = C\frac{dV}{dt} = C_j \frac{V_i}{t_{dead}} \quad \text{[Equation 3]}$$

Therefore, a minimum magnetizing inductance value Lm to ensure zero voltage switching is as shown in Equation 4.

$$L_m \leq \frac{T_{sw}t_{dead}}{16n^2 C_j} \quad [\text{Equation 4}]$$

When Equation 4 is organized and Tdead_init is put into tdead, Equation 1 is derived.

The calculated initial value Tdead_init of the dead time is applied as a dead time at the time of initial driving of the converter 100.

Alternatively, the initial dead time calculator 210 may calculate the initial dead time using a predetermined dead time value corresponding to an initial set value of some parameters of the converter 100. In this case, the parameter is referred to as a first parameter and the value of the dead time corresponding to a value of the first parameter may be pre-stored in the form of a map table in the controller 200, the initial dead time calculator 210 of the controller 200, or a separate storage.

Here, the first parameter may be an input voltage Vi and an output voltage Vo. As the input voltage Vi increases, the initial value of the dead time decreases, and as the output voltage Vo increases, the initial value of the dead time increases. Alternatively, the first parameter may be an output power Po. As the output power Po increases, the initial value of the dead time increases.

The initial dead time calculator 210 receives the initial set value of the first parameter from an upper controller or a user. Thereafter, the initial dead time calculator 210 searches a value corresponding to the input value of the first parameter among values of the dead time pre-stored in the controller 200, the initial dead time calculator 210, or the separate storage, and calculates the searched value as an initial value of the dead time. The calculated initial value of the dead time is applied as a dead time when the converter 100 is initially driven.

Figure 2A:
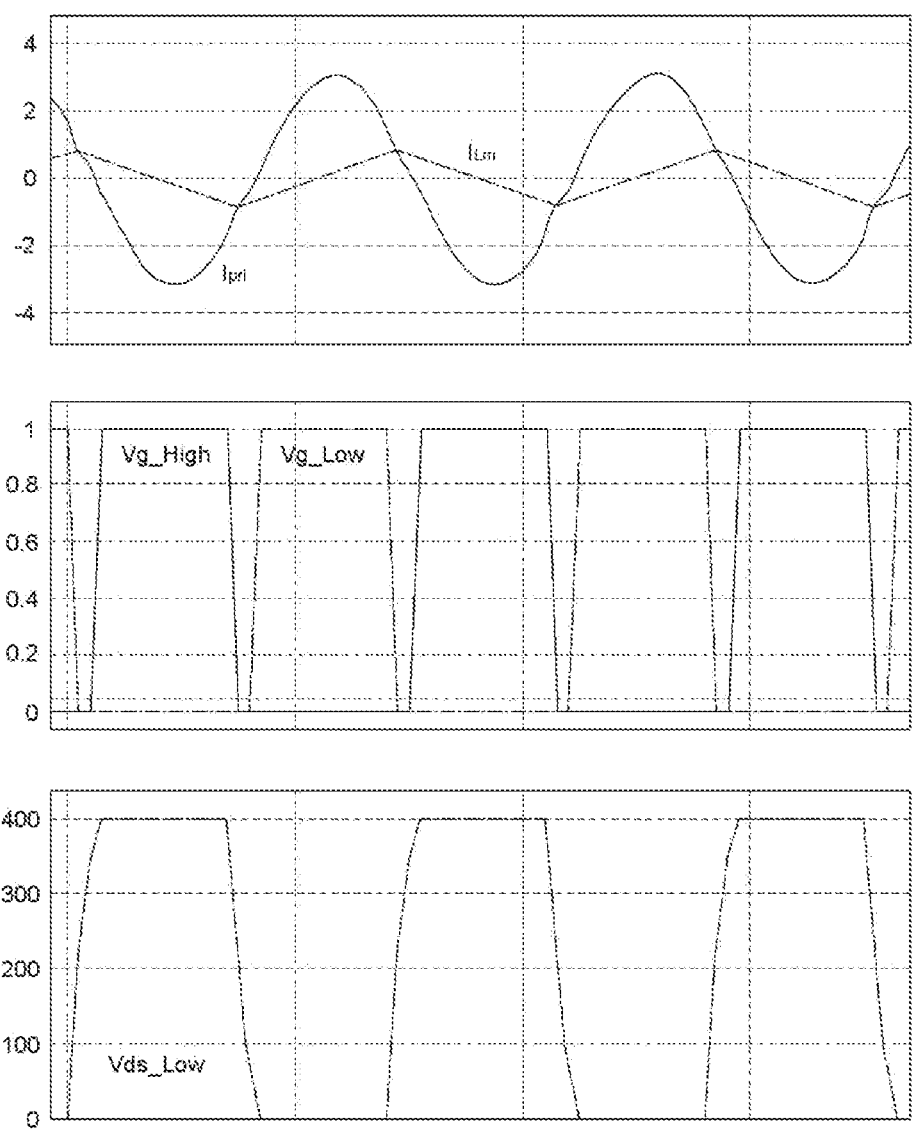
FIG. 2A is a view illustrating voltage and current waveforms of a converter when an over dead-time does not occur.
Figure 2B:
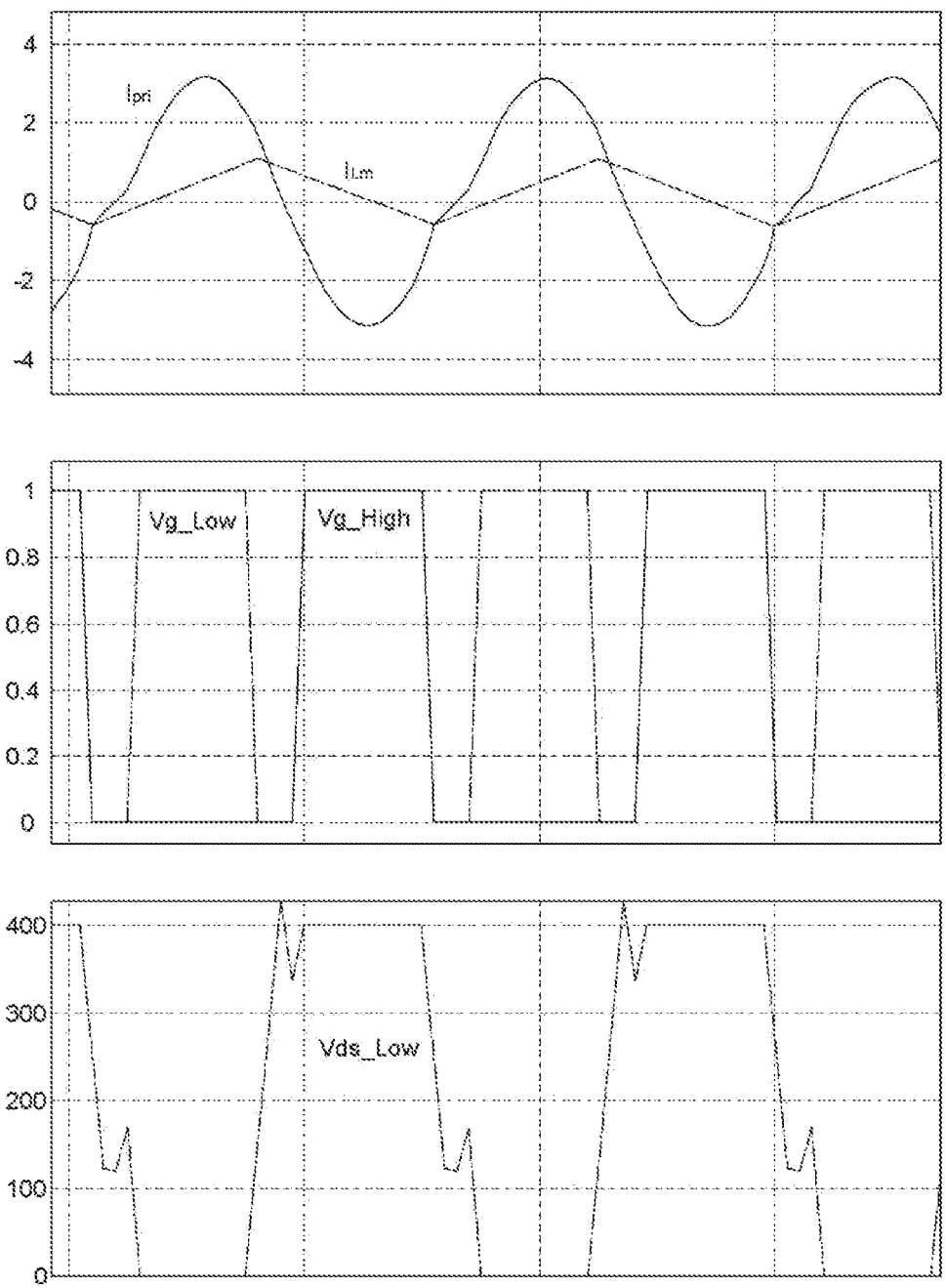
FIG. 2B is a view illustrating voltage and current waveforms of a converter when an over dead-time occurs.

FIG. 2A is a view illustrating voltage and current waveforms of the converter when an over dead-time does not occur and FIG. 2B is a view illustrating voltage and current waveforms of the converter when the over dead-time occurs.

Here, ILm denotes a current flowing through the magnetizing inductor, Ipri denotes a resonance current, Vg_High denotes a gate voltage of the upper semiconductor switch Q1, and Vg_Low denotes a gate voltage of the lower semiconductor switch Q2. Here, the lower semiconductor switch Q2 may be a semiconductor switch connected with the resonant tank in parallel. Vds_Low denotes a drain-source voltage of the lower semiconductor switch Q2.

When the dead time is appropriately maintained during the alternate switching operation between the upper and lower semiconductor switches Q1 and Q2 forming the bridge-arm 110, the drain-source voltage Vds_Low of the lower semiconductor switch Q2 has waveforms shown in FIG. 2A. Thereafter, when an over dead-time state in which the dead time is applied more than necessary due to a change in a load value, changes in the Cj and Lm values based on a temperature change, and the like is entered, the drain-source voltage Vds_Low of the lower semiconductor switch Q2 has waveforms as shown in FIG. 2B.

Therefore, when the drain-source voltage Vds_Low of the lower semiconductor switch Q2 is detected as having the waveforms shown in FIG. 2B, it may be determined that the over dead-time occurs.

Hereinafter, a way in which the over dead-time detector 220 detects and determines the over dead-time in the system of varying a dead time of a converter according to an exemplary embodiment of the present invention will be described.

Figure 3:
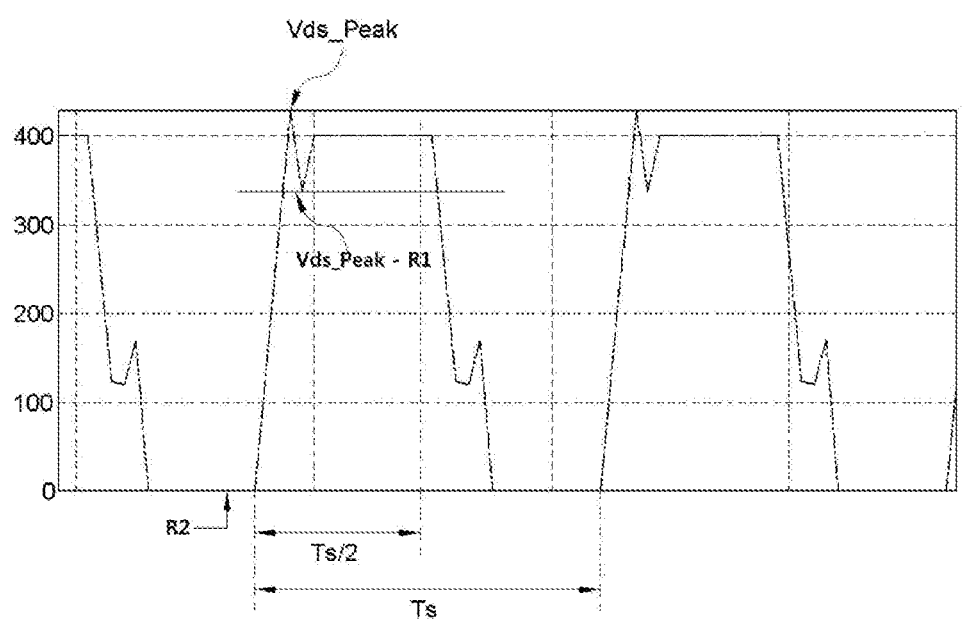
FIG. 3 is a view illustrating waveforms of a drain-source voltage of a semiconductor switch when an over dead-time occurs.

FIG. 3 is a view illustrating a waveform of a drain-source voltage of a semiconductor switch when an over dead-time occurs.

Referring to FIG. 3, it can be seen from the waveform that an overshoot phenomenon occurs in the voltage Vds_Low when the lower semiconductor switch Q2 is turned on and off in the occurrence of an over dead-time.

In order to detect the voltage waveform as described above, the over dead-time detector 220 may include a voltage detector 221 and a peak detector 222. Here, the voltage detector 221 serves to monitor the drain-source voltage Vds_Low of the lower semiconductor switch Q2 in real time, and the peak detector 222 serves to detect a peak value Vds_Peak of the voltage. The over dead-time detector 220 may determine that the over dead-time occurs if the voltage Vds_Low decreases by a first reference value R1 from the peak value within a half period of the waveform of the voltage Vds_Low.

Since the peak value Vds_Peak should be detected every one period of the waveform of the voltage Vds_Low, the peak detector 222 needs to be reset every one switching period Ts of the lower semiconductor switch Q2. To this end, the voltage detector 221 may further include a detector 223 detecting a point at which the voltage Vds_Low is lower than or equal to a second reference value R2.

The over dead-time detector 220 may reset the peak detector 222 when the detector 223 detects the point at which the voltage Vds_Low is lower than or equal to the second reference value R2, and thus, the peak detector 222 may detect the peak value Vds_Peak of the voltage Vds_Low every one switching period Ts. Preferably, the second reference value R2 may be 0V and the detector may be a zero crossing detector.

When the peak detector 222 detects the peak value Vds_Peak, the voltage detector 221 may receive the peak value Vds_Peak. While monitoring the voltage Vds_Low in real time, the voltage detector 221 determines that the over dead-time occurs if the voltage Vds_Low is reduced by the first reference value R1 from the peak value Vds_Peak within the half period Ts/2 of the voltage waveform.

Here, the first reference value R1 may be a predetermined value, and preferably, 20% of the peak value (Vds_Peak× 0.2).

As described above, the occurrence of the over dead-time reduces the efficiency of the converter 100, and thus, when the over dead-time detector 220 determines that the over dead-time occurs, the current dead time (Tdead_current) needs to be appropriately varied. To this end, the dead time resetter 230 may reduce the current dead time Tdead_current by the third reference value R3 and apply the reduced dead time to the converter 100.

Here, the third reference value R3 may be a predetermined value or may be a predetermined proportion of the current dead time. Preferably, the third reference value R3 may be 10% of the current dead time.

In the case of varying the current dead time to reset the dead time, there is a risk of excessively reducing the dead time to cause an arm short. In this case, it is necessary to vary and increase the reset dead time Tdead_re again.

To this end, the controller 200 may further include an arm short detector 240 detecting an arm short phenomenon. If the arm short detector 240 detects the arm short phenomenon after the dead time is reset, the dead time resetter 230 may vary the reset dead time Tdead_re to a fourth reference value R4. The arm short phenomenon may be detected by sensing voltage and current values across the semiconductor switch.

The fourth reference value R4 may be a value obtained by increasing the initial value of the dead time, a dead time value immediately before the occurrence of the arm short, or the current dead time by a predetermined ratio. Here, preferably, the value obtained by increasing the current (reset) dead time Tdead_re by a predetermined ratio, i.e., the re-corrected value of the dead time, is equal to or greater than the value of the dead time immediately before the occurrence of the arm short.

The arm short may also occur due to the initial value of the dead time. In this case, the dead time resetter 230 may increase the initial value of the dead time at the predetermined ratio.

Figure 4:
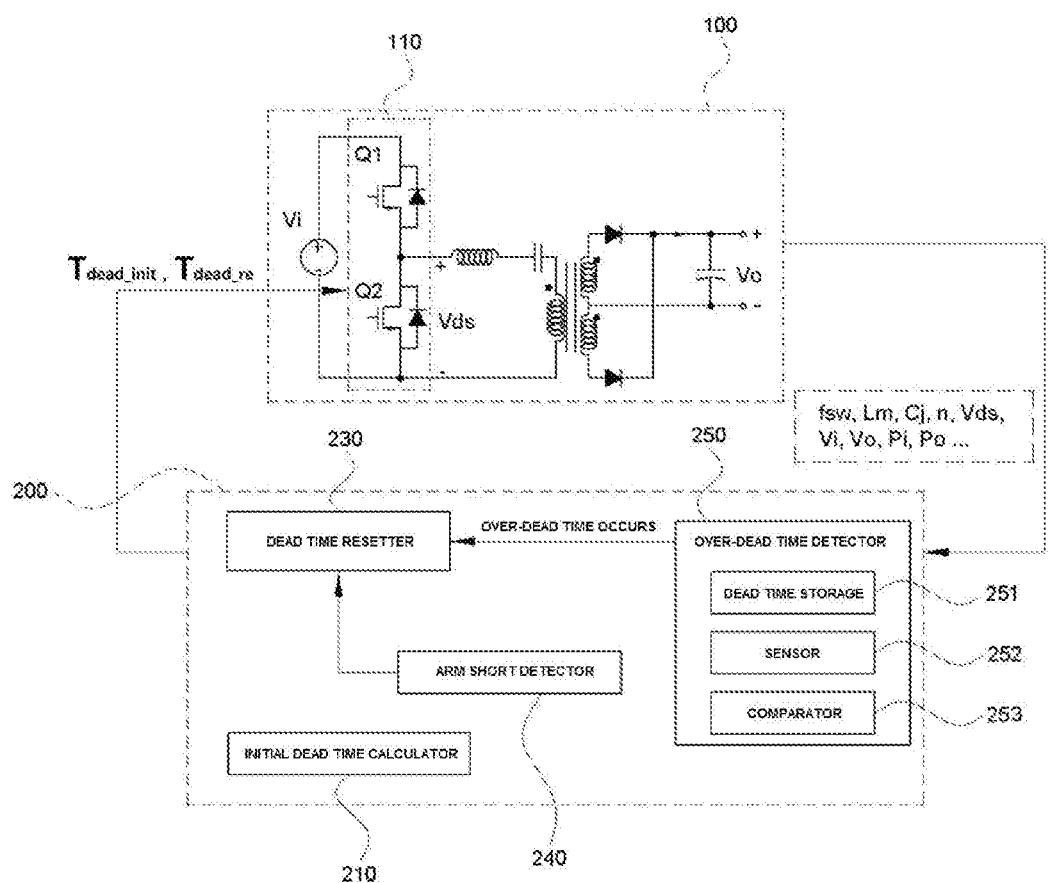
FIG. 4 is a view illustrating a system for varying a dead time of a converter according to another exemplary embodiment of the present invention.

FIG. 4 is a view illustrating a system of varying a dead time of a converter according to another exemplary embodiment of the present invention.

The system of varying a dead time of a converter according to another exemplary embodiment of the present invention is generally the same as the exemplary embodiment according to FIG. 1 of the present invention. Compared with the exemplary embodiment of FIG. 1 in which the over dead-time is determined by observing the drain-source voltage Vds_Low of the lower semiconductor switch Q2 among the upper and lower semiconductor switches Q1 and Q2 performing the alternate switching operation, in the exemplary embodiment of FIG. 4, a pre-stored appropriate value of the dead time is compared with the current dead time value, and if the current dead time value is greater than the pre-stored dead time value, it may be determined that the over dead-time occurs.

Referring to FIG. 4, in the system of varying a dead time of a converter according to another exemplary embodiment of the present invention, the over dead-time detector 250 may include a dead time storage 251, a sensor 252 and a comparator 253.

The dead time storage 251 pre-stores a value of a second parameter determining a dead time and a value of the dead time corresponding thereto. Here, the value of the dead time corresponding to the value of the second parameter may be an experimentally determined value.

The second parameter may be an input voltage Vi, an output voltage Vo and an output power Po, or may be an input voltage Vi, an output voltage Vo and an input power Pi. Alternatively, only the switching frequency fsw may be used as the second parameter.

The sensor 252 may monitor the value of the second parameter in real time. When the sensor 252 monitors the value of the second parameter in real time and delivers the monitored value of the second parameter to the dead time storage 251, the dead time storage 251 may retrieve a value of the dead time corresponding to the value of the second parameter and deliver the retrieved value of the dead time to the comparator 253.

The comparator 253 receives the pre-stored value of the dead time corresponding to the value of the second parameter and the currently set value of the dead time. Thereafter, the comparator 253 may compare the two input dead time values, and determine that an over dead-time occurs if the current value of the dead time exceeds the pre-stored value of the dead time.

Figure 5:
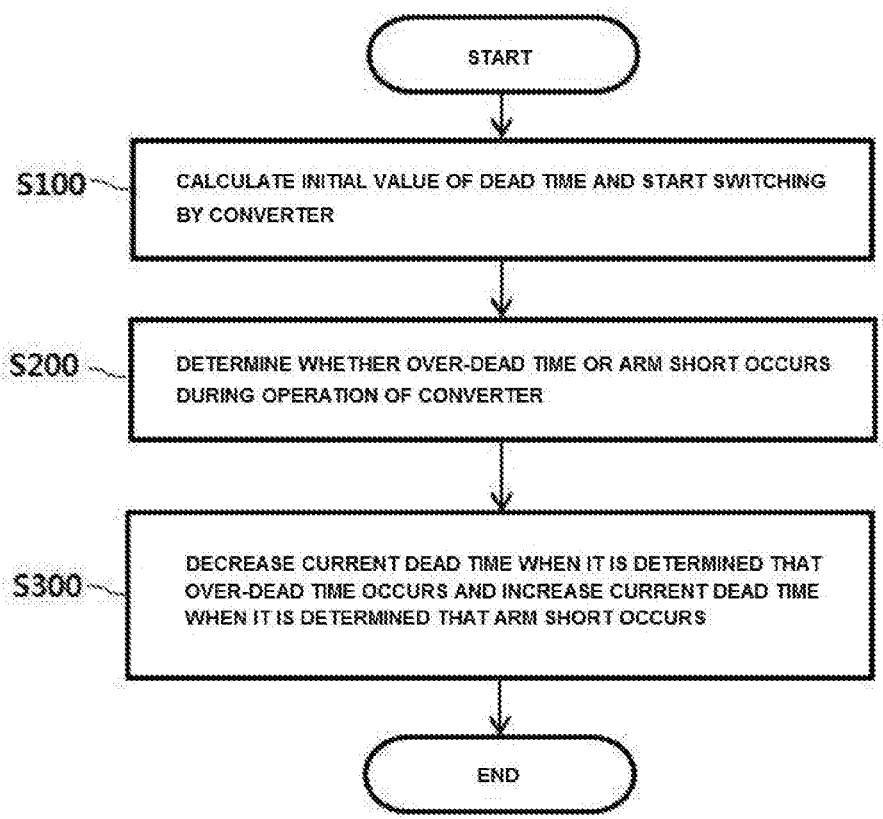
FIG. 5 is a flowchart of a method of varying a dead time of a converter according to an exemplary embodiment of the present invention.

FIG. 5 is a flowchart of a method of varying a dead time of a converter according to an exemplary embodiment of the present invention.

The method of varying a dead time of a converter 100 according to the present invention may include calculating an initial value of a dead time and starting switching by the converter 100 in operation S100, determining whether an over dead-time or an arm short occurs during the operation of the converter 100 in operation S200, and decreasing a current dead time when it is determined that the over dead-time occurs and increasing the current dead time when it is determined that an arm short occurs in operation S300.

Each of the operations described above may be performed using the system of preventing an over dead-time of the converter according to the exemplary embodiment of FIG. 1 or 4 of the present invention.

Thus, the detailed description of each operation may be replaced with the description of the system of varying a dead time of a converter according to the exemplary embodiment of FIG. 1 or 4 of the present invention.

As described above, according to the present invention, the over dead-time that occurs during the operation of the converter may be detected.

In addition, power loss of the converter may be minimized and the efficiency thereof may be increased by appropriately varying the dead time in real time.

According to the present invention, the over dead-time that occurs during the operation of the converter may be detected by observing the voltage waveform of one of the plurality of semiconductor switches that perform an alternate switching operation or by using the pre-stored value of the dead time.

In addition, according to the present invention, if the over dead-time is detected, the dead time may be reduced by the predetermined reference value, and if the arm short occurs when the dead time is reduced, the dead time may be increased again, and thus the dead time may be appropriately varied during the operation of the converter.

In addition, according to the present invention, by detecting the over dead-time and varying the detected over dead-time to an appropriate dead time as described above, power loss of the converter may be minimized, thereby increasing the efficiency of the converter.

Although the present invention has been described by limited exemplary embodiments and drawings, the present invention is not limited to the exemplary embodiments described above and various modifications and changes can be made by a person having an ordinary skill in the art to which the present invention pertains, from the descriptions above. Therefore, the spirit of the present invention is defined only by the appended claims, and encompasses all modifications and equivalents that fall within the scope of the appended claims.

DETAILED DESCRIPTION OF MAIN ELEMENTS

100: converter
110: bridge-arm
200: controller
210: initial dead time calculator
220, 250: over dead-time detector
221: voltage detector
222: peak detector
223: detector
230: dead time resetter
240: arm short detector
251: dead time storage
252: sensor
253: comparator

The invention claimed is:

1. A system of varying a dead time of a converter, the system comprising:
   a converter including a plurality of semiconductor switches to which the dead time is applied during an alternate switching operation; and
   a controller controlling ON/OFF of the plurality of semiconductor switches and setting the dead time,
   wherein the controller varies the dead time during an operation of the converter,
   wherein the controller varies the dead time when detecting an over dead-time during the operation of the converter,
   wherein the controller includes:
      an initial dead time calculator determining an initial value of the dead time;
      an over dead-time detector detecting occurrence of the over dead-time during operation of the converter; and
      a dead time resetter varying the dead time and applying the varied dead time to the converter when the occurrence of the over dead-time is detected,
   wherein the converter further includes a resonant tank, which includes a resonant inductor and a resonant capacitor, and a transformer, and the initial dead time calculator calculates the initial value of the dead time using Equation 1 below:

$$T_{dead\_init} = 16n^2 \times C_j \times f_{sw} \times L_m \quad \text{[Equation 1]}$$

where $T_{dead\_init}$ is an initial value of the dead time, n is a turn ratio of the transformer, $C_j$ is internal capacitance of one of a plurality of semiconductor switches performing an alternate switching operation, $f_{sw}$ is a switching frequency of the one semiconductor switch, and $L_m$ is magnetizing inductance of the transformer.

2. The system of claim 1, wherein the initial dead time calculator determines the initial value of the dead time based on an initial set value of a first parameter input from an upper controller or a user.

3. The system of claim 2, wherein the first parameter is an input voltage and an output voltage, the initial value of the dead time decreases as the input voltage increases, and the initial value of the dead time increases as the output voltage increases.

4. The system of claim 2, wherein the first parameter is an output power, and the initial value of the dead time increases as the output power increases.

5. The system of claim 1, wherein the over dead-time detector includes:
   a voltage detector monitoring in real time a drain-source voltage of one of the plurality of semiconductor switches that perform the alternate switching operation; and
   a peak detector detecting a peak value of the drain-source voltage,
   wherein it is determined that the over dead-time occurs when the drain-source voltage is reduced by a first reference value from the peak value within a half period of a waveform of the drain-source voltage.

6. The system of claim 5, wherein the peak detector is reset every one cycle of switching of the one semiconductor switch.

7. The system of claim 5, wherein the over dead-time detector further includes a detector detecting a point at which the voltage is lower than or equal to a second reference value, and the peak detector is reset when the detector detects the point at which the voltage is lower than or equal to the second reference value.

8. The system of claim 1, wherein the over dead-time detector includes:
   the dead time storage pre-storing a value of a second parameter of the converter that determines the dead time and a value of the dead time corresponding to the value of the second parameter;
   a sensor monitoring the value of the second parameter in real time; and
   a comparator comparing a currently input value of a dead time with the pre-stored value of the dead time corresponding to the value of the second parameter,
   wherein it is determined that the over dead-time occurs when the current value of the dead time exceeds the pre-stored value of the dead time.

9. The system of claim 8, wherein the second parameter is: an input voltage; an output voltage and an output power; an input voltage, an output voltage, and an input power; or a switching frequency.

10. The system of claim 1, wherein the varied dead time is a value varied by the dead time resetter by varying the dead time by a third reference value.

11. The system of claim 1, wherein the controller further includes an arm short detector detecting an arm short phenomenon of the converter, and when the arm short phenomenon is detected after the dead time is reset, the dead time resetter varies the reset dead time with a fourth reference value.

12. A method of varying a dead time of a converter including a plurality of semiconductor switches to which a dead time is applied at the time of an alternate switching operation, the method comprising:
   calculating an initial value of the dead time using Equation 1 below and starting switching by the converter;

$$T_{dead\_init} = 16n^2 \times C_j \times f_{sw} \times L_m \quad \text{[Equation 1]}$$

where $T_{dead\_unit}$ is an initial value of the dead time, n is a turn ratio of the transformer, $C_j$ is internal capacitance of one of a plurality of semiconductor switches performing an alternate switching operation, $f_{sw}$ is a switching frequency of the one semiconductor switch, and $L_m$ is magnetizing inductance of the transformer;
   determining whether an over dead-time or an arm short occurs during an operation of the converter; and
   decreasing a current dead time when it is determined that the over dead-time occurs, and increasing the current dead time when it is determined that the arm short occurs.

* * * * *